Sept. 21, 1965   J. GASSMANN ET AL   3,207,426
ROTARY-PISTON ENGINE CONSTRUCTION
Filed Jan. 14, 1963

INVENTORS.
JOHANNES GASSMANN
RICHARD EHRHARDT
BY
Dicke & Craig
ATTORNEYS.

United States Patent Office 3,207,426
Patented Sept. 21, 1965

3,207,426
ROTARY-PISTON ENGINE CONSTRUCTION
Johannes Gassmann, Altbach, and Richard Ehrhardt, Stuttgart-Unterturkheim, Germany, assignors to Daimler-Benz Aktiengesellschaft, Stuttgart-Unterturkheim, Germany
Filed Jan. 14, 1963, Ser. No. 251,209
Claims priority, application Germany, Mar. 31, 1962, D 38,547
11 Claims. (Cl. 230—145)

The present invention relates to a radial seal for pistons in rotary-piston internal combustion engines which consists of a vane-like sealing member arranged within a groove or channel disposed parallel to the axis of the engine or of the piston.

During operation of rotary-piston internal combustion engines, the gas pressure within the working chambers is used to press the vane-like sealing member in the radial direction outwardly against the internal cam surface of the surrounding envelope body. However, in operation, the gas pressure also exerts forces which press the vane-like sealing member with a lateral surface thereof against a side wall of the groove provided within the piston. By reason of the relatively large side surfaces of the vane-like sealing member, the lateral forces assume considerable values so that, during rotation of the piston, at times those forces which press the vane-like sealing member radially outwardly are smaller than the lateral forces. If the forces acting against the bottom of the vane-like sealing member thereafter predominate again, then there occurs for the most part a very vehement radial movement on the part of the vane-like sealing member as a result of which the lubricating film at the internal cam surface of the surrounding envelope body is penetrated and wear appearances are caused at the cam surface.

The present invention is concerned with eliminating the aforementioned disadvantages, and as solution of this problem, essentially consists in arranging at the two side surfaces of the vane-like sealing members, indentations, recesses or the like which are in communication with each other through the sealing member and/or below the sealing member. As a result of these relatively simple measures at the sealing member, it is possible to produce a pressure equalization to such an extent that a sealing abutment of the sealing member against a side surface of the groove is still just assured whereas therebeyond no significant forces occur which prevent or impair the radial movements of the sealing member.

According to one embodiment of the present invention, the recesses or the like may be arranged within the side surfaces of the sealing member and may be connected with each other by cross bores extending through the sealing member.

According to another embodiment in accordance with the present invention, the recesses or the like in the side surfaces of the sealing member may, however, also extend to the lower and/or forward and/or rear edges of the sealing member and may be connected with each other through cross bores through the sealing member.

According to still another embodiment of the present invention, the recesses or the like, however, may be arranged also within the side surfaces of the sealing member and may extend to the lower edge thereof.

Accordingly, it is an object of the present invention to provide a seal structure for rotary-piston internal combustion engines of the type mentioned hereinabove which eliminates, in an effective manner and by extremely simple means, the shortcomings and disadvantages encountered with the prior art constructions.

It is another object of the present invention to provide a radial seal in the form of sealing elements disposed within axially extending grooves in the rotary piston which minimizes the effects caused by pressure differences in adjoining working chambers separated by the seal which act against the lateral surfaces thereof.

Still another object of the present invention resides in the provision of a radial seal for pistons of rotary-piston internal combustion engines which reduces the effects that would otherwise impair the operation, of a change in the absolute value between lateral and radial forces acting on the sealing members.

A further object of the present invention resides in the provision of a radial seal for rotary-piston internal combustion engines which minimizes wear and tear caused by sudden impacts against the surfaces of the surrounding body along which slides the seal.

These and other objects, features and advantages of the present invention will become more obvious from the following description when taken in connection with the accompanying drawing which shows, for purposes of illustration only, several embodiments in accordance with the present invention, and wherein—

Figure 1:
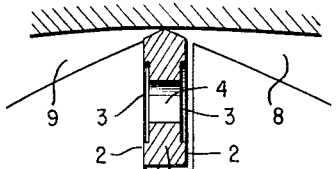
FIGURE 1 is a partial schematic cross sectional view through a rotary-piston internal combustion engine provided with a radial seal in accordance with the present invention.
Figure 2:
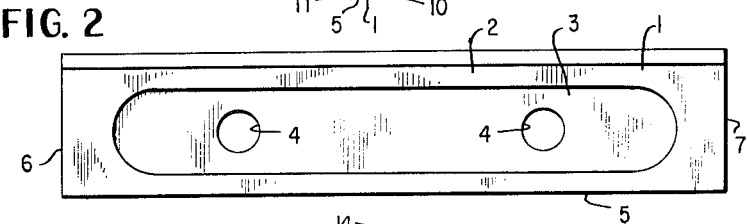
FIGURE 2 is a side elevational view of the vane-like sealing member of FIGURE 1.

Referring now to the drawing wherein like reference numerals are used throughout the various views to designate corresponding parts, and more particularly the FIGURES 1 and 2 thereof, reference numeral 1 designates therein the vane-like sealing member which is provided at the side surfaces 2 thereof with recesses or indentations 3. The recesses or indentations 3 provided on opposite sides of the vane-like sealing member 1 are connected with each other by way of cross bores 4 extending through the vane-like sealing member 1. As may be seen in particular from FIGURE 2, the recesses or indentations 3 do not extend to the lower edges 5 of the sealing member 1 and also fail to extend to the forward edge 6 and the rear edge 7 thereof. The sizes of the areas of the recesses 3 are determinative for the pressure relief which is to be achieved thereby. If, for example, a higher gas pressure is present within the working chamber 8 of the rotary piston internal combustion engine of trochoidal construction indicated in FIGURE 1 than in the working chamber 9, then the sealing member 1 is pressed within the groove 10 that extends parallel to the axis of the piston, against the side wall 11 of the groove 10 whereby the abutment pressures depend exclusively on the gas pressure which acts on the side surface 2 nearer working chamber 8 less the surface of the recess 3.

Figure 3:
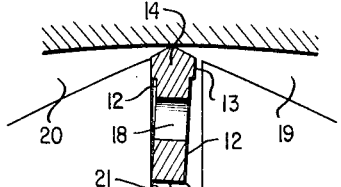
FIGURE 3 is a partial schematic cross sectional view through a rotary piston internal combustion engine provided with a modified radial seal in accordance with the present invention.
Figure 4:
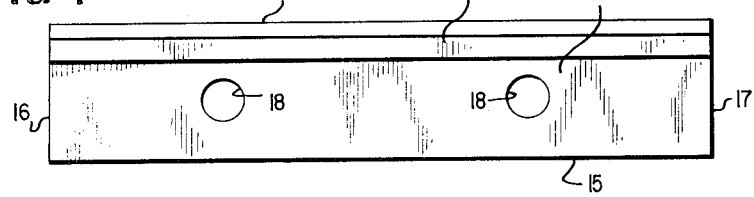
FIGURE 4 is a side elevational view of the vane-like sealing member of FIGURE 3.

In the second embodiment illustrated in FIGURES 3 and 4, the recesses 12 provided on opposite side surfaces 13 of the sealing member 14 extend to the lower edges 15 as well as also to the forward edges 16 and rear edges 17. Cross bores 18 extending through the sealing member 14 connect the recesses 12 with each other.

With a higher pressure within the working chamber 19 than within the working chamber 20, the sealing member 14 abuts with a slight inclination against the side surface 21 of the groove 22 that extends parallel to the axis of the piston. As in the first embodiment, a certain pressure equalization is realized so that the sealing member 14 is not pressed with larger forces against the side surfaces 21 of the groove 22.

Figure 5:
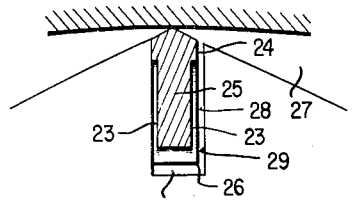
FIGURE 5 is a partial schematic cross sectional view through a rotary-piston internal combustion engine provided with a still further modified radial seal in accordance with the present invention.
Figure 6:
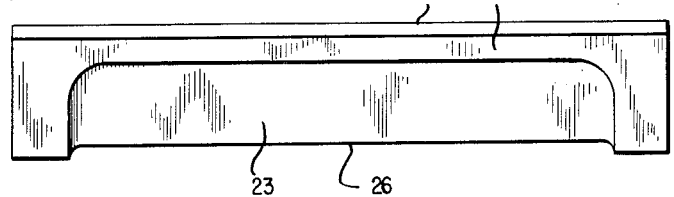
FIGURE 6 is a side elevational view of the vane-like sealing member of FIGURE 5.

The recesses 23 provided at the side surfaces 24 of the sealing member 25 in the embodiment of FIGURES 5 and 6 extend to the lower edges 26 of the center portion of the sealing members, however, they do not extend to the forward and rear edges thereof. Cross bores through the sealing member 25 itself are not necessary in this embodiment as the gas may be able, for purposes of equalization of the pressure, to pass from one recess 23 to the other aperture underneath the bottom edge 26 of the sealing member 25. As shown in FIGURE 5, the gas having the higher pressure within the working chamber 27 finds its path through the gap 28 between the side surface 24 of the sealing member 25 and the side surface 29 of the groove 30 that again extends parallel to the piston axis, reaches in this manner the lower part of the groove 30 underneath the bottom edge 26, and from there passes into the recess 23 at that side surface of the sealing member 25 which abuts against the other side surface of the groove 30.

While we have shown and described three embodiments in accordance with the present invention, it is understood that the same is not limited thereto, but is susceptible to numerous changes and modifications within the spirit and scope of the present invention as known to a person skilled in the art, and we therefore do not wish to be limited to the details shown and described herein, but intend to cover all such changes and modifications as are encompassed by the scope of the appended claims.

We claim:

1. A radial seal structure for pistons in rotary piston internal combustion engines which have groove means extending substantially parallelly to the axis thereof, comprising vane-like means having top, bottom and side surfaces, both of the side surfaces of said sealing means being provided with recesses, said recesses extending at least nearly over the entire dimension of the sealing means in the axial direction thereof and terminating inside at least the top surface thereby leaving a rib extending over the entire length in the axial direction of the sealing means which effectively constitutes a seal for a respective recess in the radially outward direction, and means including cross-bore means extending through said sealing means for effectively establishing a communication between the recesses disposed on opposite sides of said sealing means.

2. A radial seal structure for pistons in rotary piston internal combustion engines which have groove means extending substantially parallelly to the axis thereof, comprising vane-like sealing means having top, bottom and side surfaces, both of the side surfaces of said sealing means being provided with recesses, said recesses being arranged at the side surfaces and extending over the major portion of each sealing means in the axial direction thereof but terminating a substantial distance inside the top, bottom, and side surfaces of said sealing means, and means including cross bore means extending through said sealing means for effectively establishing a communication between the recesses disposed on opposite sides of said sealing means.

3. A radial seal structure for pistons in rotary-piston internal combustion engines which have groove means extending substantially parallelly to the axis thereof, comprising vane-like sealing means having side surfaces, a top surface and a bottom surface, the side surfaces of said sealing means being provided with recesses extending over the entire axial length of a respective sealing means up to the lower as well as forward and rear edges of said side surfaces but terminating a substantial distance below the top surface, and means including cross bore means extending through said sealing means for effectively establishing a communication between the recesses disposed on opposite sides of said sealing means.

4. A radial seal structure for pistons in rotary piston internal combustion engines which have grooves means extending substantially parallelly to the axis thereof, comprising vane-like sealing means having side surfaces, a top surface and a bottom surface, the side surfaces of said sealing means being provided with recesses, said recesses being disposed inside of said side surfaces and extending over the major portion of the axial length to the lower edges of said sealing means but terminating a substantial distance below the top surface, and means effectively establishing a communication between the recesses disposed on opposite sides of said sealing means.

5. In a rotary piston internal combustion engine having a piston provided with a channel extending substantially parallelly to the axis thereof for receiving therein a sealing element adapted to move radially outwardly.

the improvement essentially consisting of seal means within said channel in the form of a vane-like sealing member having side surfaces, a top surface, and a bottom surface and provided with recesses along both side surfaces, the recesses extending over the major portion of the axial dimension of a respective vane-like sealing member but terminating inside at least a respective top surface by a substantial distance to leave a radially outward seal extending over the entire axial length of the sealing member and constituted by the side surface thereof, and means in the form of spaced bores effectively providing a communication between said recesses to equalize the pressure differential existing in the working spaces separated by said seal means.

6. The combination according to claim 5 wherein the recesses on both sides of the sealing member are of equal size.

7. The combination according to claim 6, wherein said recesses terminate also inside of the side surfaces thereof by a substantial distance.

8. The combination according to claim 7, wherein the recess along each lateral surface is constituted by a single relatively large and oblong recess extending over a substantial part of the axial length of the sealing member.

9. The combination according to claim 8, wherein said recesses terminate also inside of the bottom surface by a substantial distance.

10. The combination according to claim 5, wherein said recesses terminate also inside of both side and bottom surfaces so as to be surrounded on all sides by sealing portions constituted by the unrecessed lateral surfaces of the sealing member.

11. The combination according to claim 10, wherein the recesses on both sides extend over a substantial part of the axial length of the sealing member to both sides of the center plane thereof.

(References on following page)

References Cited by the Examiner

UNITED STATES PATENTS

| | | | |
|---|---|---|---|
| 1,358,176 | 11/20 | Rolaff | 230—152 |
| 1,635,522 | 7/27 | Wilson | 230—152 |
| 1,692,473 | 11/28 | Smith | 230—152 |
| 2,466,389 | 4/49 | Davis | 123—8 |
| 2,844,099 | 7/58 | Modrey | 103—123 X |
| 2,873,683 | 2/59 | Sherwood | 103—123 X |
| 2,969,020 | 1/61 | Fazekas | 103—123 X |
| 3,033,180 | 5/62 | Bentele | 123—8 |
| 3,083,699 | 4/63 | Froede | 91—56 |
| 3,102,493 | 9/63 | Davin | 103—135 |

FOREIGN PATENTS

| | | |
|---|---|---|
| 590,085 | 3/25 | France. |
| 22,712 | 1911 | Great Britain. |
| 398,141 | 9/33 | Great Britain. |
| 732,394 | 6/55 | Great Britain. |

KARL J. ALBRECHT, *Primary Examiner.*

JOSEPH H. BRANSON, Jr., *Examiner.*